(12) United States Patent
Furuta (10) Patent No.: US 8,803,938 B2
(45) Date of Patent: Aug. 12, 2014

(54) ELECTROPHOTOGRAPHIC IMAGE FORMING APPARATUS

(71) Applicant: Canon Kabushiki Kaisha, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/651,735

(22) Filed: Oct. 15, 2012

(65) Prior Publication Data

US 2013/0106973 A1    May 2, 2013

(30) Foreign Application Priority Data

Oct. 28, 2011  (JP) ................................. 2011-237960
Oct. 4, 2012   (JP) ................................. 2012-222543

(51) Int. Cl.
*B41J 2/47*     (2006.01)

(52) U.S. Cl.
USPC ....................................................... 347/253

(58) Field of Classification Search
USPC .......... 347/236, 237, 240, 246, 247, 251–254
See application file for complete search history.

(56) References Cited

U.S. PATENT DOCUMENTS 5,579,090 A  * 11/1996  Sasanuma et al. ............... 399/49
8,351,802 B2 *  1/2013  Sonoda et al. .................. 399/12

FOREIGN PATENT DOCUMENTS

JP     2005-178041 A      7/2005
JP     2011025502 A  *  2/2011  ................. B41J 2/44

* cited by examiner

*Primary Examiner* — Hai C Pham
(74) *Attorney, Agent, or Firm* — Fitzpatrick, Cella, Harper & Scinto (57) ABSTRACT

An image forming apparatus forms a first patch with a light amount obtained by reducing a target light amount of a light amount control unit by a predetermined percentage, and forms a second patch with a light amount obtained by a shading control unit reducing the target light amount by the predetermined percentage. Furthermore, the image forming apparatus determines a correction coefficient that is used for modification data for each scanning position in common so that there is no error between a detected value of the first patch and a detected value of the second patch.

5 Claims, 7 Drawing Sheets

ELECTROPHOTOGRAPHIC IMAGE FORMING APPARATUS

BACKGROUND OF THE INVENTION

1. Field of the Invention

The present invention relates to an electrophotographic image forming apparatus.

2. Description of the Related Art

An electrophotographic image forming apparatus forms an electrostatic latent image on a photosensitive member by scanning the photosensitive member using laser light deflected by a rotating polygonal mirror, and forms an image by developing the electrostatic latent image using toner. The density of the image changes by changing the light amount of the laser light. Lenses and mirrors are arranged on an optical path from the rotating polygonal mirror to the photosensitive member. Along the scanning direction of the laser light deflected by the rotating polygonal mirror, the laser light deflected by the rotating polygonal mirror is incident on various positions of the lenses and mirrors depending on the rotation angle of the rotating polygonal mirror. The transmittance of the lenses through which the laser light passes and the reflectance of the mirrors that reflect the laser light are uneven along the scanning direction. Therefore, along the scanning direction of the laser light, the light amount (intensity) of the laser light varies among different positions on the photosensitive member irradiated by the laser light (scanning positions). This gives rise to the problem that the density of the image is uneven along the scanning direction of the laser light.

Japanese Patent Laid-Open No. 2005-178041 proposes an image forming apparatus that executes shading control in accordance with scanning positions without using a digital-to-analog converter.

However, the invention of Japanese Patent Laid-Open No. 2005-178041 does not take into account changes in the light emitting characteristics of the laser light caused by the ambient temperature around the image forming apparatus and temporal changes in the image forming apparatus. Therefore, according to this invention, the degree of control on the light amount deviates from the degree of control set for initial adjustment, thus giving rise to error in the degree of control.

SUMMARY OF THE INVENTION

In view of the above, the present invention provides an image forming apparatus that keeps error in the degree of control within an allowable range even when the light emitting characteristics of a laser have changed due to the ambient temperature and temporal changes.

The present invention provides an image forming apparatus comprising the following element. A light source is configured to output a light beam. A light amount control unit executes light amount control to make a light amount of the light beam output from the light source equal to a target light amount. A deflection unit deflects the light beam output from the light source and scans a surface of a scan target using the deflected light beam. A shading control unit controls the light amount of the light beam output from the light source by controlling a driving current for the light source for each scanning position on the surface of the scan target. A correction unit corrects the driving current using a correction amount corresponding to a detected value of a first patch formed with a light amount obtained by the light amount control unit reducing the target light amount by a predetermined percentage, and to a detected value of a second patch formed with a light amount obtained by the shading control unit reducing the target light amount by the predetermined percentage.

Further features of the present invention will become apparent from the following description of exemplary embodiments (with reference to the attached drawings).

DESCRIPTION OF THE EMBODIMENTS

A description is now given of an exemplary embodiment. The present embodiment is an image forming apparatus that executes shading control, i.e. controls the light amount of laser light in accordance with scanning positions of the laser light so as to limit unevenness in the density of an image formed in various regions on a photosensitive drum (photosensitive member). In particular, the image forming apparatus adjusts the degree of shading control in accordance with density information or electric potential information obtained from the results of detection of pattern images.

[Overall Configuration of Image Forming Device]

Figure 1:
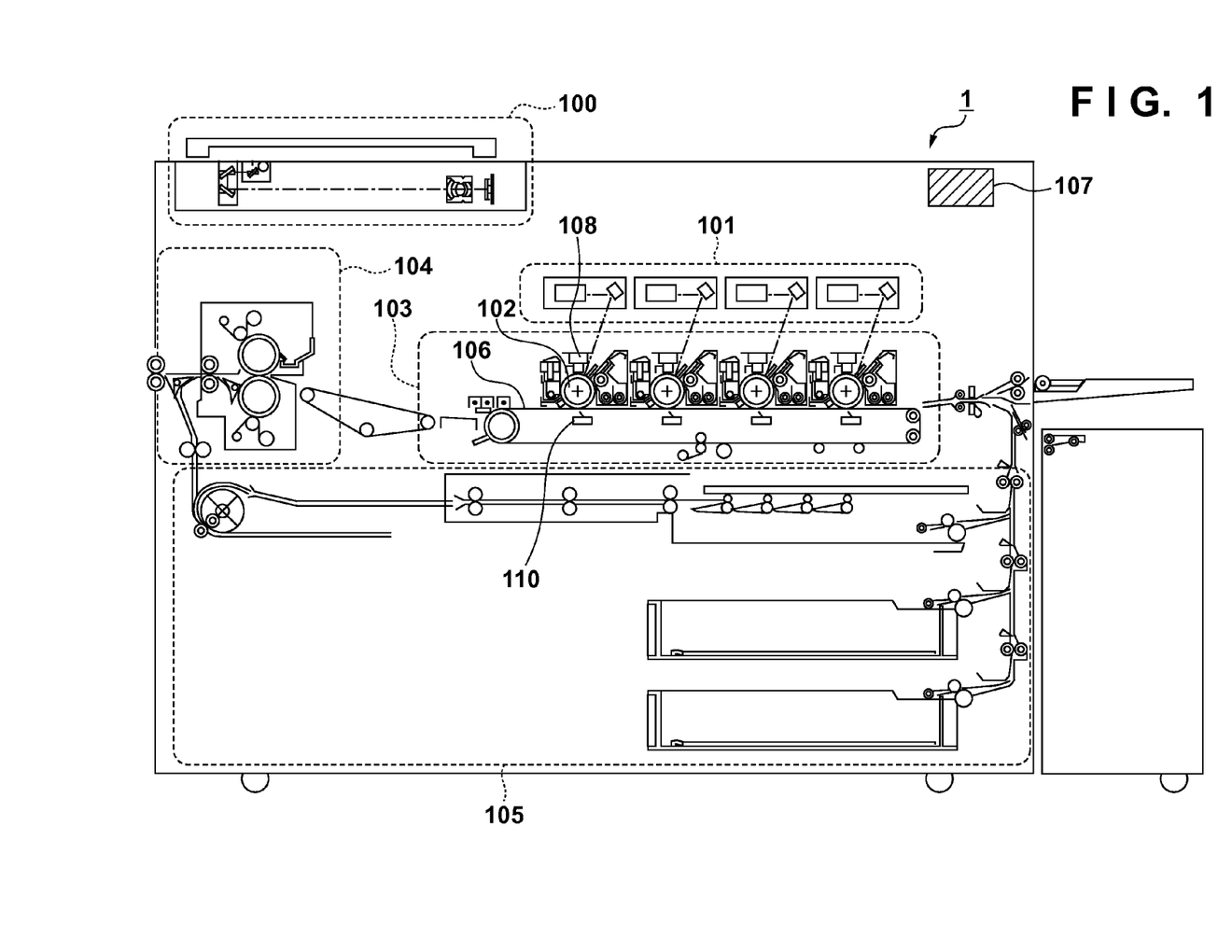
FIG. 1 shows one example of an image forming apparatus.

The following briefly describes an electrophotographic image forming apparatus according to the present embodiment with reference to FIG. 1. An image forming apparatus 1 includes a scanner unit 100, a laser exposure unit 101, a photosensitive drum 102, an image forming unit 103, a fixing unit 104, a paper feed/conveyance unit 105, and a printer control unit 107 that controls these components. The scanner unit 100 optically reads an image of a document placed on a platen while illuminating the document, and creates image data by converting the read image into an electric signal. The laser exposure unit 101 emits laser light that is modulated in accordance with the image data. The image forming unit 103 includes a charger 108, a developer 109 and a transfer unit 110. The image forming unit 103 drives and rotates the photosensitive drum 102. The charger 108 charges the surface of the photosensitive drum 102 that has been driven and rotated. The laser exposure unit 101 exposes the photosensitive drum charged by the charger 108 to the laser light corresponding to the image data. As a result of exposure to the laser light, an electrostatic latent image is formed on the photosensitive drum 102. The developer 109 develops the electrostatic latent image formed on the photosensitive drum 102 using toner. The transfer unit 110 transfers the toner image formed on the photosensitive drum 102 to a sheet that is conveyed by a sheet conveyance belt 106 (sheet conveyance member). The fixing unit 104 fixes the toner image on the sheet by fusing the toner image with heat and pressure. The printer control unit 107 controls the image forming apparatus 1 as a whole.

Note that the present embodiment discusses an example in which the toner image formed on the photosensitive drum 102 is directly transferred to the sheet that is conveyed by the conveyance belt 106. However, embodiments are not limited in this way. Alternatively, the image forming apparatus may be configured to transfer the toner image formed on the photosensitive member to an intermediate transfer member such as an intermediate transfer belt, and transfer the toner image transferred to the intermediate transfer member to the sheet.

In the image forming apparatus 1 according to the present embodiment, toner patterns, which will be described later, are formed on the sheet conveyance belt 106. On the other hand, in an image forming apparatus including an intermediate transfer member, these toner patterns are formed on the intermediate transfer member. In the image forming apparatus according to the present embodiment and the image forming apparatus including the intermediate transfer member, these toner patterns may be formed on a recording medium such as a sheet.

Figure 2:
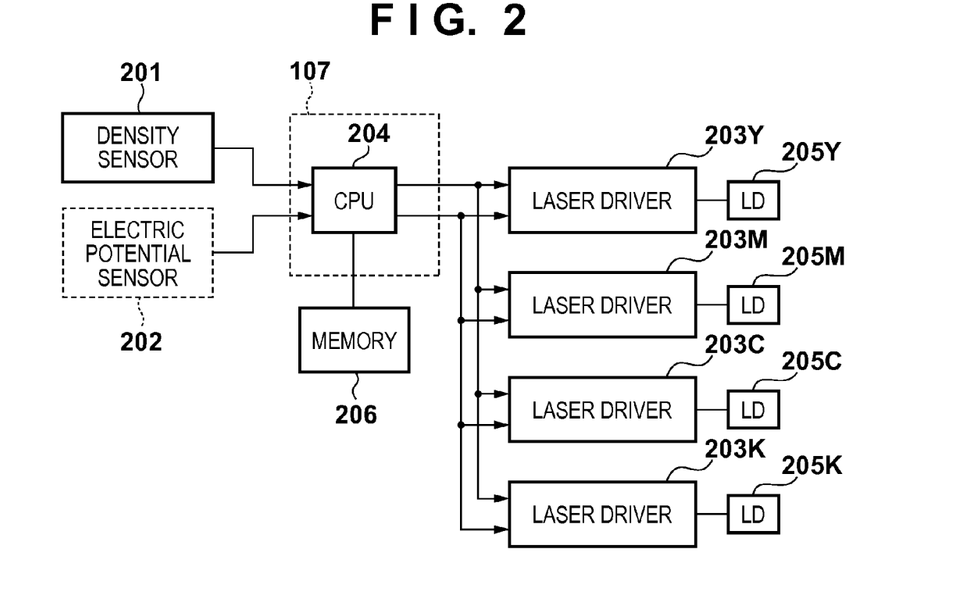
FIG. 2 shows one example of a control unit.

FIG. 2 shows a density sensor 201 and laser drivers 203Y, 203M, 203C and 203K connected to the printer control unit 107.

The printer control unit 107 includes a CPU 204. The density sensor 201 is arranged to detect toner patterns formed on the sheet conveyance belt 106, and the CPU 204 controls the laser drivers 203Y, 203M, 203C and 203K in accordance with the results output from the density sensor 201. The laser drivers 203Y, 203M, 203C and 203K respectively drive the corresponding light sources, namely lasers 205Y, 205M, 205C and 205K, in accordance with an instruction from the CPU 204. It should be noted that the letters Y, M, C and K respectively denote yellow, magenta, cyan and black. Below, when the points that are the same for all colors are explained, the letters Y, M, C and K are omitted from the reference signs. Based on the detected density information, the CPU 204 sets, for each laser driver, a reference voltage that serves as a reference when driving a laser, and a duty cycle for modifying the laser light amount for each scanning position. The CPU 204 executes automatic light amount control (APC) for each laser. A target value of the automatic light amount control is referred to an APC light amount. The duty cycle is a coefficient by which the APC light amount is multiplied. A memory 206 stores therein data for forming toner patterns. When forming the toner patterns, the CPU 204 reads data for forming patches from the memory 206 and outputs the read data to the laser drivers 203.

Figure 3:
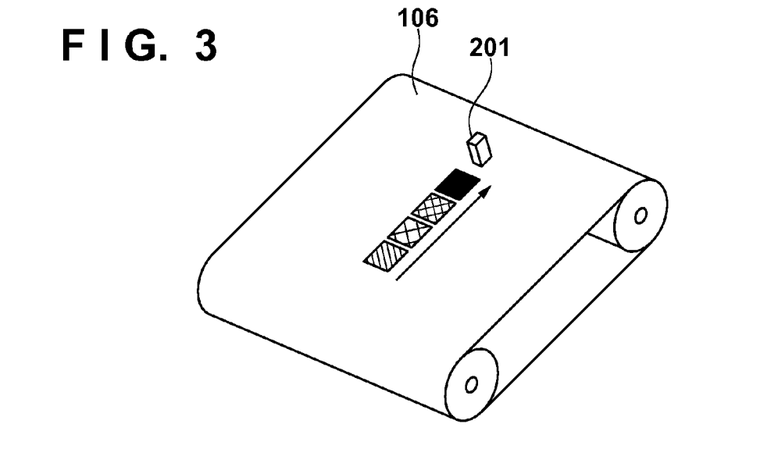
FIG. 3 shows the position at which a density sensor is arranged.

FIG. 3 shows the position at which the density sensor 201 is arranged with respect to the sheet conveyance belt 106. As shown in FIG. 3, the density sensor 201 detects toner patterns that are formed on the sheet conveyance belt 106 with different densities, and outputs the output signals corresponding to these densities to the CPU 204. The density sensor 201 includes a light emitting element and a light receiving element. Out of the light output from the light emitting element, the light reflected by a toner pattern is received by the light receiving element. The density sensor 201 outputs an output signal corresponding to the light amount of the received light.

An electric potential sensor 202 shown in FIG. 2 detects the electric potential of the charged photosensitive drum 102 and the electric potential of the electrostatic latent image formed on the photosensitive drum 102. The CPU 204 adjusts a charge voltage and a laser light amount in accordance with the electric potentials detected by the electric potential sensor 202. In this way, the density of an image can be kept constant even when the photosensitive characteristics of the photosensitive drum 102 have changed over time.

[Specifics of Laser Exposure Unit 101]

Figure 4:
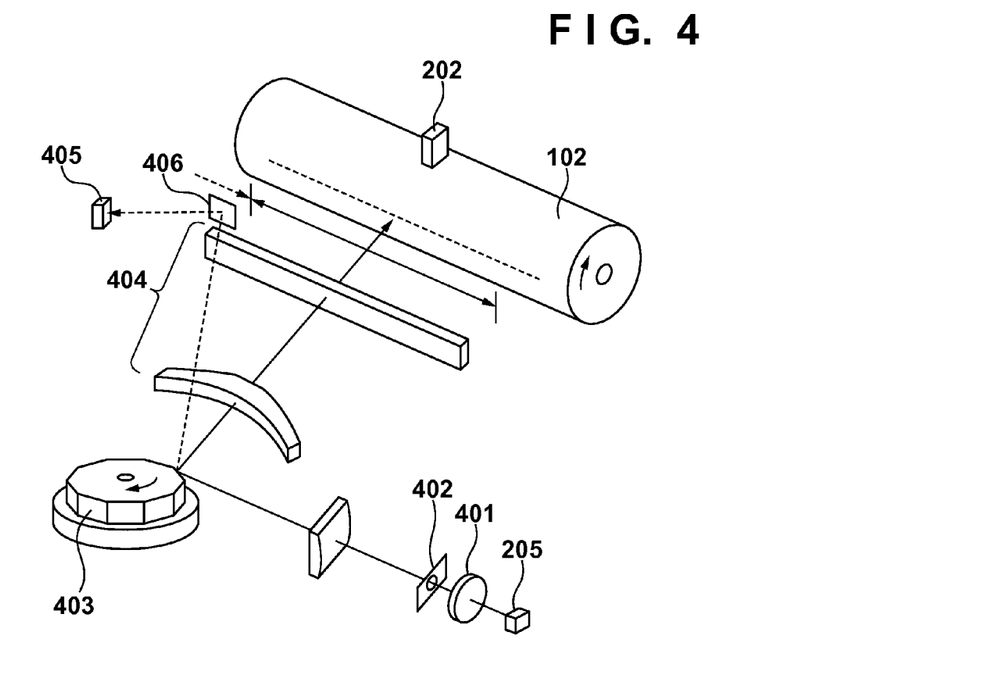
FIG. 4 shows one example of a laser exposure unit.

A description is now given of the laser exposure unit 101 with reference to FIG. 4. Beams of light emitted from a laser 205 become collimated light due to a collimator lens 401 and a diagraph 402, and the parallel light is incident on a polygonal mirror 403 with a predetermined beam diameter. The polygonal mirror 403 deflects laser light output from a light source so that the laser light scans the photosensitive drum 102. In FIG. 4, the polygonal mirror 403 rotates in the direction of the arrow at a uniform angular velocity. While the polygonal mirror 403 is rotating, the laser light is incident on a reflective surface of the polygonal mirror 403. As a result, the laser light is converted into scanning light that scans the photosensitive drum 102 along a predetermined direction (scanning direction). After the laser light deflected by the polygonal mirror 403 passes through fθ lenses 404, the photosensitive drum 102 is exposed to the laser light. The fθ lenses 404 have a function of causing the laser light deflected by the polygonal mirror 403 to scan the photosensitive drum 102 at a constant velocity along the direction of the two-headed arrow. A beam detection sensor 405 detects light reflected by the polygonal mirror 403 via a mirror 406. A detection signal (BD signal) from the beam detection sensor 405 is used by the CPU 204 as a synchronization signal for synchronizing the rotation of the polygonal mirror 403 with data writing. Note that BD is the abbreviation of beam detection.

Incidentally, the transmittance and reflectance of an optical system are uneven along the scanning direction of laser light. Therefore, even when a laser emits laser light having a constant light amount, the light amount to which the photosensitive drum 102 is exposed varies among different scanning positions. This variation in the light amount among different scanning positions gives rise to the problem of the scanning positions on the photosensitive drum 102 not being exposed to laser light with corresponding target light amounts. For this reason, the CPU 204 controls a light amount in accordance with scanning positions (shading control). It is assumed here that a time period from when the beam detection sensor 405 detects laser light to when the beam detect sensor 405 subsequently detects laser light is one scanning cycle. A scanning position (exposure position) of laser light on the photosensitive drum 102 is specified by a counter that executes a counting operation while using the timing at which the beam detection sensor 405 detected the laser light as a reference. The counter is built in the CPU 204.

Figure 5:
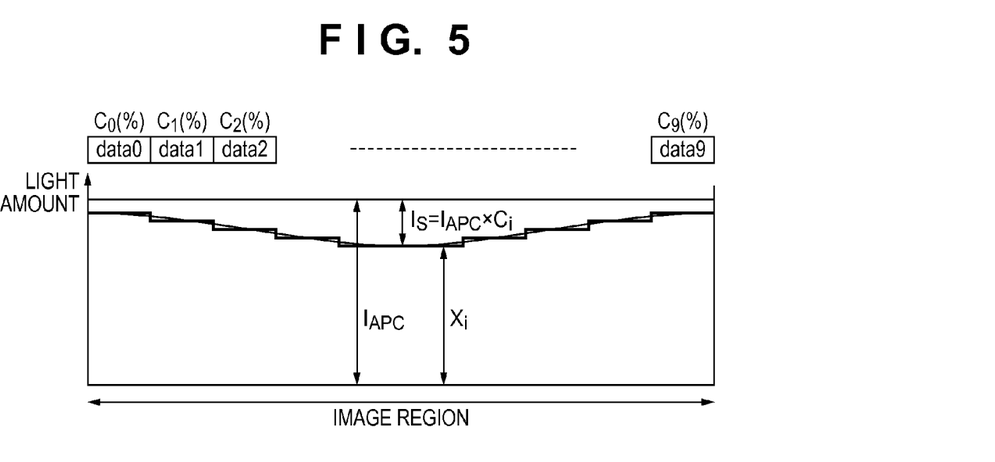
FIG. 5 shows one example of shading control.

FIG. 5 shows one example of the shading control. $I_{APC}$ denotes a light amount determined by the APC which will be described later (hereinafter referred to as an APC light amount). Ci denotes modification data that has been determined for each scanning position in an image region. In the image forming apparatus according to the present embodiment, the image region on the photosensitive drum 102 is divided into 10 subregions along a main scanning direction. As shown in FIG. 5, the modification data is set for each of the 10 subregions.

[Specifics of Laser Driver 203]

Figure 6:
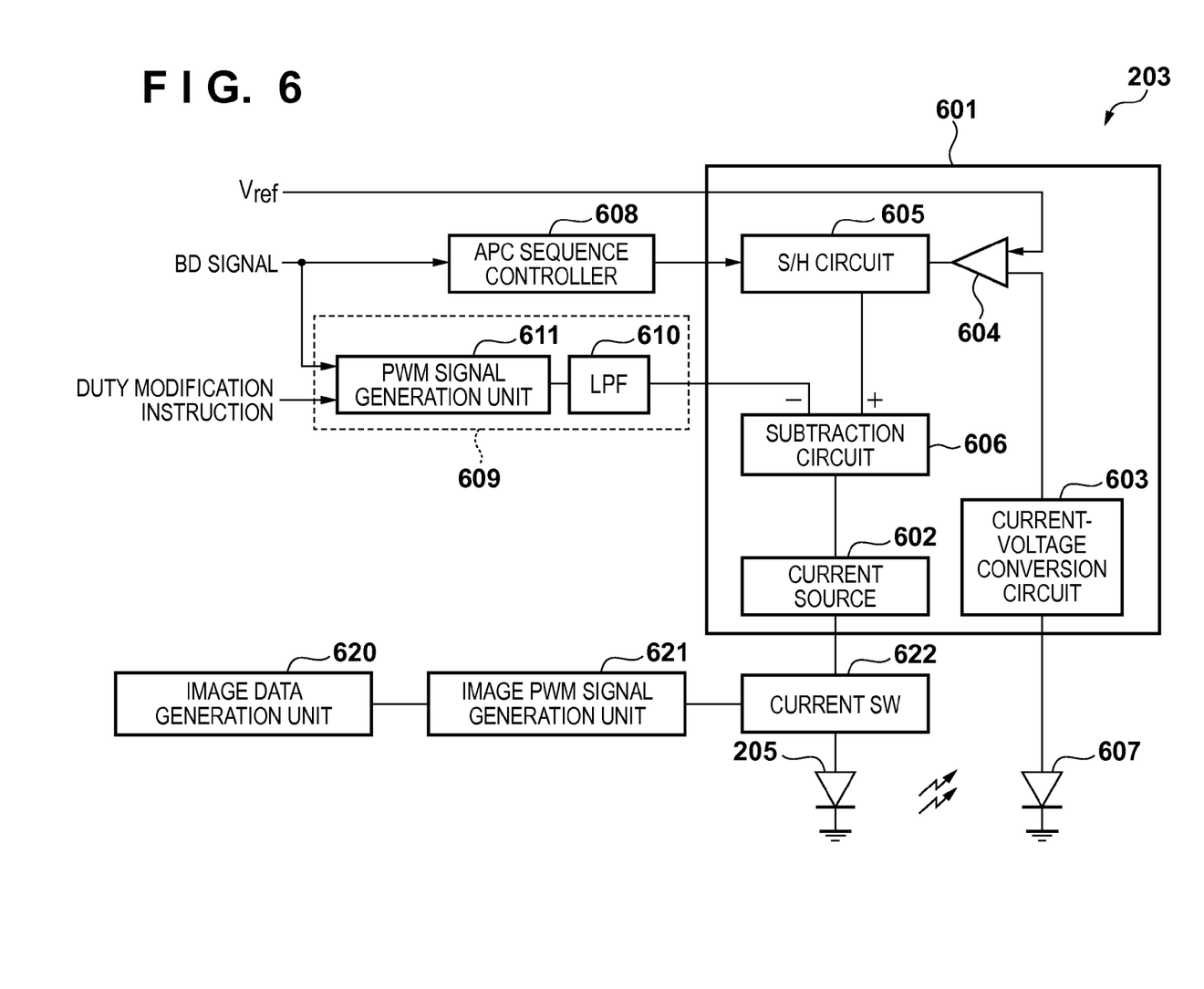
FIG. 6 shows one example of a laser driver.

The following describes the shading control executed by a laser driver 203 with reference to FIG. 6. First, an image data generation unit 620 and an image PWM signal generation unit 621 are explained. The image data generation unit 620 generates binary image data by, for example, converting multivalued data input from a host computer or the scanner unit 100 into binary data and executing color processing and the like. The image data generation unit 620 then outputs the generated image data to the image PWM signal generation unit 621. The image PWM signal generation unit 621 converts the binary image data into a PWM signal and outputs the PWM signal to a current SW 622. The PWM signal output from the image PWM signal generation unit 621 is one type of control signals for controlling on/off of a laser, namely a light source. That is to say, the PWM signal is a high- or low-level logic signal for switching between on and off of the current SW 622. For example, when the PWM signal is at a high level, the current SW 622 turns on and a current is supplied from a current source 602 to a laser 205. On the other hand, when the PWM signal is at a low level, the current SW turns off and the supply of the current from the current source 602 to the laser 205 is blocked.

A light amount control unit 601 functions as an automatic light amount control (automatic power control) unit that executes automatic light amount control (APC) to make the light amount of laser light emitted from a light source equal to a target light amount. The current source 602 drives the laser by supplying a driving current corresponding to a voltage output from a subtraction circuit to the laser 205. A photodiode 607 is a light receiving element that receives light output from the laser 205. In the present embodiment, the photodiode 607 and the laser 205 are arranged in the same package. A current-voltage conversion circuit 603 converts a current output from the light receiving element into a voltage. A comparator 604 is a comparison circuit that compares the voltage output from the conversion circuit with a reference voltage corresponding to a target light amount. An S/H circuit 605 is a sample and hold circuit that samples and holds a result of comparison output from the comparison circuit. A computation circuit 606 is a subtraction circuit that outputs a voltage corresponding to a difference between the voltage output from the sample and hold circuit and the voltage output from a shading control unit 609. An APC sequence controller 608 manages a timing for executing the APC on the basis of the BD signal output from the beam detection sensor 405.

For example, under control by the APC sequence controller 608, the APC is executed at a timing when laser light scans a non-image region in which an image is not formed. A region scanned by the laser light is divided into an image region in which an image is formed using the laser light, and a non-image region in which an image is not formed using the laser light. Accordingly, one scanning cycle is divided into an image forming period in which an image is formed, and a non-image forming period in which an image is not formed. An image forming period occurs between two non-image forming periods. As spatial regions and temporal periods are thus in one-to-one correspondence, an absolute scanning position can be obtained by the counter executing the counting operation on the basis of the BD signal.

The CPU 204 controls the laser driver 203 to cause the laser 205 to emit laser light during a non-image forming period within one scanning cycle. That is to say, in order for the current source 602 to supply the driving current to the laser 205, the CPU 204 causes the image PWM signal generation unit to output a high-level signal so as to turn on the current SW 622. The photodiode 607 receives the laser light emitted from the laser 205 during the non-image forming period and generates a current corresponding to the light amount of the received laser light. The generated current is converted into a voltage value by the current-voltage conversion circuit 603. The current-voltage conversion circuit 603 can be realized by, for example, a resistor. The comparator 604 compares the voltage value Vpd corresponding to the light amount of the received laser light with the reference voltage Vref that was set by the CPU 204 in advance. The S/H circuit 605 outputs an instruction voltage to the current source 602 via the computation circuit 606 so that the current source 602 supplies a current to the laser 205. After the comparator 604 compares the reference voltage Vref with the voltage value Vpd, when the result of comparison shows that the voltage value Vpd is small compared to the reference voltage Vref, the S/H circuit 605 increases the instruction voltage by one level. On the other hand, when the result of comparison shows that the voltage value Vpd is large compared to the reference voltage Vref, the S/H circuit 605 reduces the instruction voltage by one level. By repeating this feedback operation, the laser driving current that is supplied from the current source 602 to the laser 205 is controlled so that the voltage value Vpd corresponding to the light amount of the received light matches the target reference voltage Vref.

The current SW 622 controls on/off of the laser 205 while an image region is scanned. More specifically, the current SW 622 turns on/off the current that is supplied from the current source 602 to the laser 205 while the laser light from the laser 205 is scanning the image region on the photosensitive drum 102. Accordingly, the laser 205 turns on and off while the image region is scanned. As has been mentioned above, the image data generation unit 620 generates image data and outputs the image data to the image PWM signal generation unit 621. The image PWM signal generation unit 621 generates an image PWM signal that determines a lighting time period (duty cycle) corresponding to a pixel in accordance with the input image data, and outputs the image PWM signal to the current SW 622. The current SW 622 switches between on and off in accordance with the input image PWM signal. In other words, the current SW 622 passes and blocks the current that is supplied from the current source 602 to the laser 205 in accordance with the input image PWM signal. Note that the lighting time period of the laser 205 corresponds to the density of a pixel.

The light amount of the laser 205 determined by the APC is in one-to-one correspondence with the reference voltage Vref. The light amount changes linearly with respect to the reference voltage Vref.

The shading control unit 609 includes a PWM signal generation unit 611 and an LPF 610, and controls the light amount of the laser light emitted from the laser 205 by controlling the current for driving the laser 205 for each scanning position on the surface of the photosensitive drum 102. PWM is the abbreviation for pulse-width modulation, whereas LPF is the abbreviation for a low-pass filter. The PWM signal generation unit 611 shown in FIG. 6 outputs a PWM signal with a duty cycle (pulse width) that has been set by the CPU 204 in accordance with a scanning position of the laser light. More specifically, the PWM signal generation unit 611 generates a PWM signal (for shading modification) with a pulse width corresponding to a time period that has elapsed since the BD signal was detected (the value counted by the counter). The counted value indicates a position being scanned by the laser light along the main scanning direction. In other words, the counted value indicates a main scanning position. The CPU 204 reads a pulse width corresponding to the current main scanning position from a table that defines a relationship between main scanning positions and pulse widths, and sets the read pulse width to the PWM signal generation unit 611. Note that the pulse widths correspond to modification amounts of the light amount (shading amounts) for different main scanning positions.

The PWM signal output from the PWM signal generation unit 611 is smoothed by passing through the LPF 610. The LPF 610 is a low-pass filter that applies a voltage generated by low-pass-filtering of a pulse signal to the subtraction circuit. In FIG. 6, the LPF 610 generates a shading control voltage by smoothing the PWM signal and outputs the shading control voltage to the computation circuit 606.

The computation circuit 606 modifies the reference voltage value set by the APC sequence controller 608 based on the signal output from the LPF 610, and outputs the modified voltage value to the current source 602. The current source 602 outputs a driving current corresponding to the input voltage value to the laser 205. More specifically, the computation circuit 606 outputs, to the current source 602, a voltage generated by subtracting the shading control voltage x from the output voltage of the S/H circuit 605 determined by the APC. By increasing the duty cycle of the PWM signal, the shading control voltage x increases. As the shading control voltage x increases, the voltage value output from the subtraction circuit 606 to the current source 602 decreases. As a result, the value of the driving current supplied to the laser 205 decreases, and therefore the light amount of the laser light output from the laser 205 is reduced. On the other hand, by decreasing the duty cycle of the PWM signal, the shading control voltage x decreases. As the shading control voltage x decreases, the voltage value output from the subtraction circuit 606 to the current source 602 increases. As a result, the value of the driving current supplied to the laser 205 increases, and therefore the light amount of the laser light output from the laser 205 increases.

As has been mentioned earlier, the APC is executed when the laser light is scanning a non-image region. During the execution of the APC, the shading control unit 609 sets the shading control voltage x to zero. When the APC is not executed (during the image formation), the S/H circuit 605 holds the voltage determined by the APC. Hence, the laser light amount in an image region is controlled only by the shading control voltage.

In the above-described manner, by changing the duty cycle of the PWM signal output from the PWM signal generation unit 609, the light amount of laser light can be controlled to correspond to the scanning position of the laser light. However, as the amount of change in the light amount with respect to the degree of shading control (the correction amount of the laser driving current) fluctuates over time depending on the laser characteristics, it is necessary to adjust the degree of shading control.

[Method for Adjusting Degree of Shading Control]

In the present embodiment, the density sensor 201 reads the toner patterns formed on the sheet conveyance belt 106, and the degree of shading control is determined based on the results of the reading.

Figure 7:
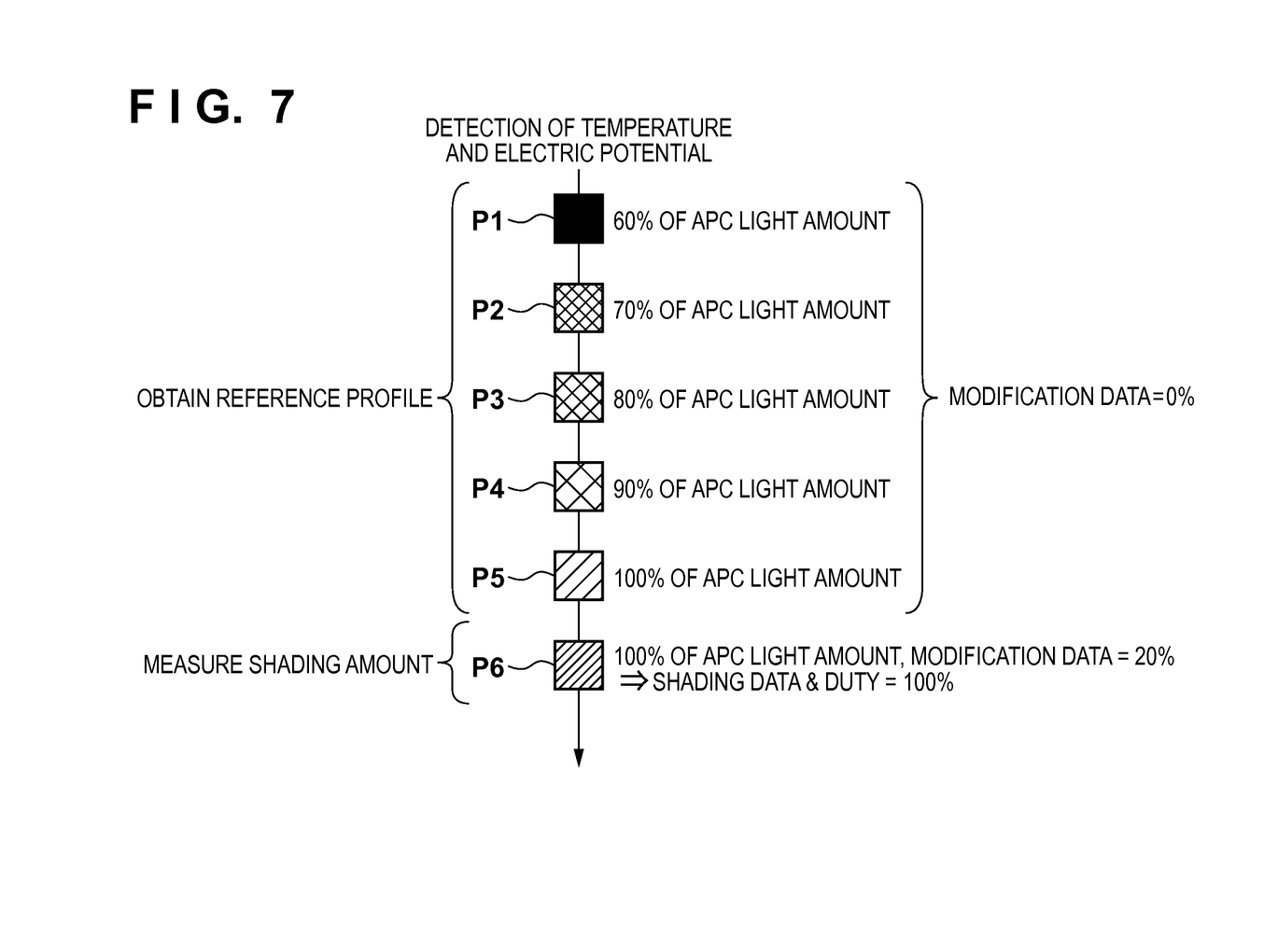
FIG. 7 shows examples of patches.

FIG. 7 shows examples of the toner patterns formed on the sheet conveyance belt 106. In the present embodiment, five levels of light amount are set using the APC light amount as a reference, and five toner patterns P1 to P5 are formed with different densities. The toner patterns P1 to P5 are referred to as a first toner pattern group. When forming the toner patterns P1 to P5, the shading control is not executed. That is to say, the duty cycle of the pulse signal that is output from the PWM signal generation unit 611 is maintained at 0% when forming the toner patterns P1 to P5.

A toner pattern P6 is formed with a light amount that has been set based on shading data (the duty cycle of the PWM signal). In the example of FIG. 7, the toner pattern P6 is formed with the shading data set to 80% (the modification data set to 20%). Although there is one toner pattern P6 in FIG. 7, the toner pattern P6 may be provided in plurality and therefore is referred to as a second toner pattern group. In the present embodiment, the CPU 204 adjusts the degree of shading control based on a correction amount corresponding to the results of detection of the densities of the first toner pattern group and the result of detection of the density of the second toner pattern group.

As the APC controls the light amount of laser light to correspond to the reference voltage, the first toner pattern group is formed with a density corresponding to the light amount corresponding to the reference voltage. Accordingly, a relationship between light amounts and densities (light amount-density characteristics) can be obtained. By comparing the light amount-density characteristics with the density of the second toner pattern group that is formed based on the shading data determined in advance, the light amount corresponding to this shading data can be derived. The modification data can be corrected based on the relationship between the derived shading data and light amount. In this way, the shading data and the modification data can be maintained at appropriate values even when the laser characteristics have changed over time.

Figure 8:
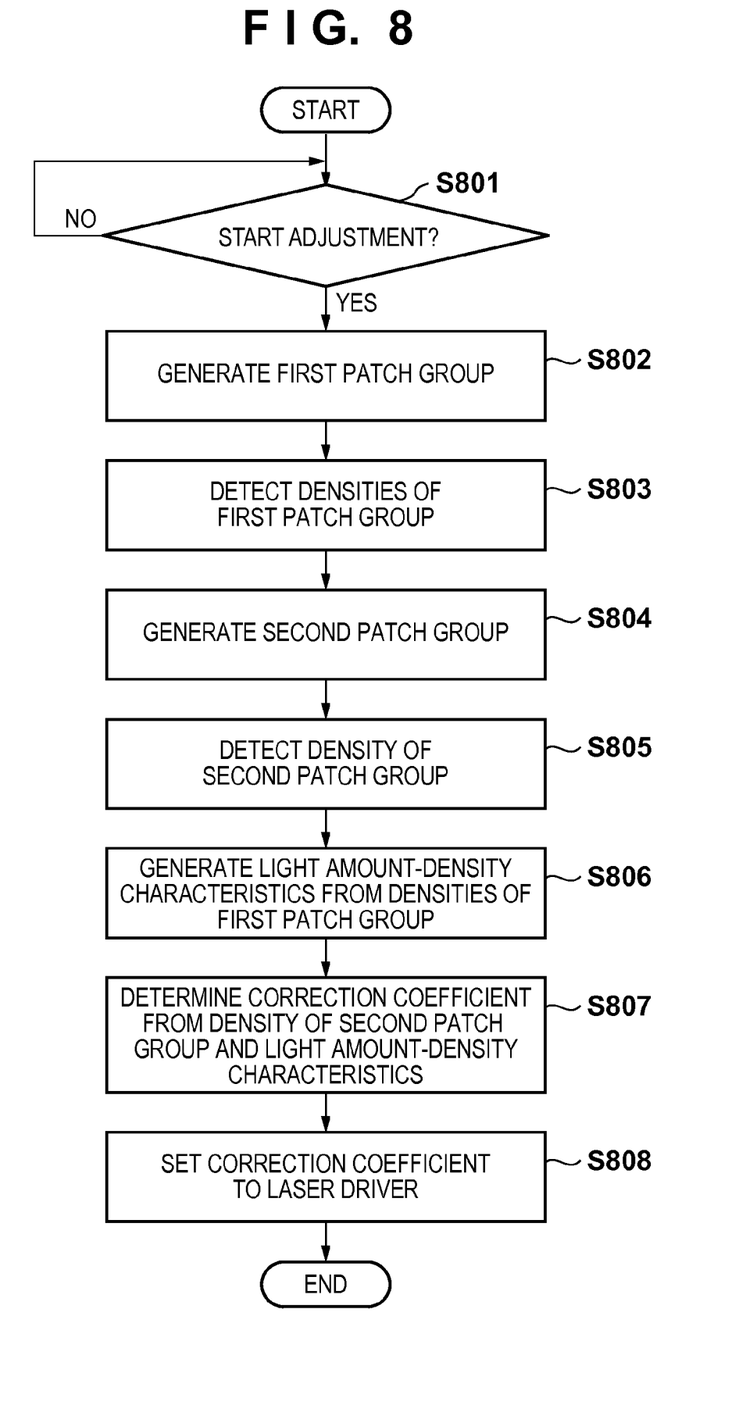
FIG. 8 is a flowchart of a method for adjusting a degree of shading control.

A specific operation is explained below with reference to FIG. 8. The CPU 204 adjusts the degree of shading control during an initial adjustment period that follows immediately after the power of the image forming apparatus 1 is turned on or between multiple print jobs.

In S801, the CPU 204 determines whether or not a condition for starting the adjustment of the degree of shading control is satisfied. This condition is, for example, the on-state of the image forming apparatus 1 or completion of a print job. When this condition is satisfied, the processing moves to S802.

In S802, the CPU 204 controls the laser exposure unit 101, the photosensitive drum 102 and the image forming unit 103 to generate the first toner pattern group. The first toner pattern group is composed of the toner patterns P1 to P5 that are formed by causing a laser 205 to emit light with light amounts corresponding to 60%, 70%, 80%, 90% and 100% of the APC light amount, respectively. As a result, the toner patterns P1 to P5 shown in FIG. 7 are formed on the sheet conveyance belt 106. At this time, a duty cycle of 100% is set to the PWM signal generation unit 611. In this way, when forming the first toner patterns, the light amount control unit 601 controls the light source so as to reduce the target light amount by a predetermined percentage of its maximum value (100%), and the duty cycle of the pulse signal output from the PWM signal generation unit 611 is maintained at 0%. That is to say, the first toner patterns are formed by changing the reference voltage Vref that is used to set the target light amount. The light amount of the light emitted from the laser 205 can be adjusted by changing the target light amount of the APC or by changing the shading light amount Is (modification data Ci). The first toner patterns can be formed by changing the target light amount out of those.

In S803, the CPU 204 detects the densities of the first toner pattern group formed on the sheet conveyance belt 106 using the density sensor 201. In this manner, the density sensor 201 detects the densities of toner patterns included in the first toner pattern group and the second toner pattern group which will be described later.

In S804, the CPU 204 controls the laser exposure unit 101, the photosensitive drum 102 and the image forming unit 103 to form the second toner pattern group. For example, the CPU 204 sets the duty cycle of the pulse signal output from the PWM signal generation unit 611 so that the duty cycle of the PWM signal for executing the shading control is 20% when forming the second toner pattern group. As a result, the toner pattern P6 is formed on the sheet conveyance belt 106 by the laser light whose light amount has been modified by the PWM signal with a duty cycle of 20%. In this way, when forming the second toner pattern, the light amount control unit 601 maintains the target light amount at its maximum value (100%), and the shading control unit 609 reduces the duty cycle of the light source by a predetermined percentage (e.g. 20%). That is to say, the second toner pattern is formed by changing the duty cycle, namely the degree of shading control.

In S805, the CPU 204 detects the density of the second toner pattern group formed on the sheet conveyance belt 106 using the density sensor 201.

In S806, the CPU 204 creates the light amount-density characteristics (reference profile) from the light amounts used to form the first toner pattern group and the densities corresponding to those light amounts. In this manner, the CPU 204 creates the light amount-detected value characteristics from a correspondence relationship between the light amounts used to form the toner pattern group and the detected values obtained from the toner pattern group.

In S807, the CPU 204 compares the density of the toner pattern P6, namely the second toner pattern group, with the light amount-density characteristics, and determines a correction coefficient R for the degree of shading control Is. The CPU 204 functions as a computation unit that obtains a light amount corresponding to the detected value of the second toner pattern group from the light amount-detected value characteristics created by the creating unit, and computes a correction coefficient so that there is no error in the light amount corresponding to the detected value of the second toner pattern group with respect to the light amounts used to form the first toner pattern group. A specific method for determining the correction coefficient R will be described later with reference to FIG. 9.

In S808, the CPU 204 sets the correction coefficient R to the laser driver 203. The correction coefficient R is a multiplier coefficient that is used for all scanning positions. The detected values of the first toner pattern group that was formed with a light amount obtained by reducing the target light amount by a predetermined percentage, and the detected value of the second toner pattern group that was formed with a light amount obtained by reducing the target light amount by a predetermined percentage, indicate a degree of change in the light emitting characteristics of the laser caused by the ambient temperature and temporal changes. That is to say, the corresponding correction amount can be obtained from the detected values of the first toner pattern group and the detected value of the second toner pattern group. The aforementioned correction coefficient R corresponds to the detected values of the first toner pattern group that was formed with the light amount obtained by reducing the target light amount by the predetermined percentage and to the detected value of the second toner pattern group that was formed with the light amount obtained by reducing the target light amount by the predetermined percentage. Therefore, the CPU 204 corrects the driving current using the correction amount corresponding to the detected values of the first and second toner pattern groups.

Figure 9:
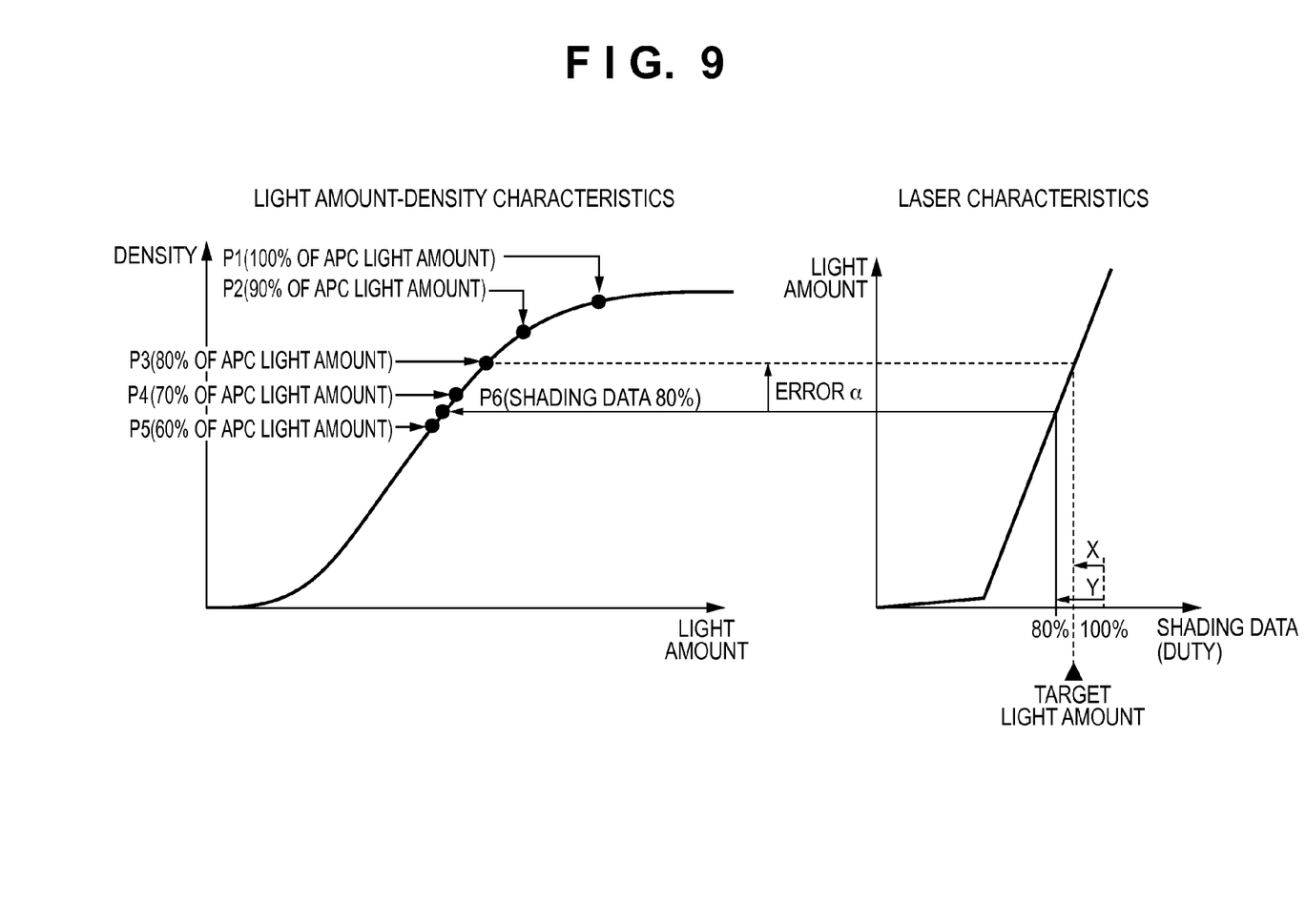
FIG. 9 shows one example of the light amount-density characteristics.

FIG. 9 shows one example of the light amount-density characteristics. Changes in the density reflect changes in the laser light amount, the developing characteristics and the transfer characteristics. That is to say, when a degree of adjustment of the APC light amount for modifying a change in the density is in one-to-one correspondence with a degree of shading control, the density can be adjusted by adjusting the degree of shading control while keeping the APC light amount constant.

Therefore, in the present embodiment, the CPU 204 first creates the light amount-density characteristics (reference profile) by applying linear approximation to the results of detection of densities corresponding to a plurality of different laser light amounts. One of the plurality of laser light amounts is a light amount corresponding to 80% of the APC light amount. It is assumed here that a correspondence relationship between the degrees of shading control and the light amounts (the laser characteristics shown on the right side of FIG. 9) is stored in advance in a ROM built in the CPU 204.

The CPU 204 determines the correction coefficient R for modification data Xi through comparative calculation on the created reference profile and the density of the toner pattern P5 that was formed by light emission with modification data Xi set to 20% (shading data set to 80%). When the modification data is set to 20%, the duty cycle is 80%, and the shading data is 80% of the APC light amount. Therefore, the density of the toner pattern P3 that was formed with a light amount corresponding to 80% of the APC light amount should fundamentally match the density of the toner pattern P6 that was formed with the modification data set to 20%. However, the two densities do not match due to the aforementioned reason, and error α occurs therebetween.

One example of a method for comparative calculation is explained below. Here, the CPU 204 compares the density D6 of the toner pattern P6 (shading data=80%, modification data=20%) with the density D3 of the toner pattern P3 (80% of the APC light amount), and calculates the correction coefficient R from a difference therebetween. The correction coefficient R can be calculated using the following Expressions 1 to 3.

$$G=(D3-D5)/20\%$$ Expression 1

$$\alpha[\%]=(D3-D6)/G$$ Expression 2

$$R=Y/X=20\%/(20\%-\text{error }\alpha)$$ Expression 3

G denotes a density gradient for the toner patterns P3 and P5. The density gradient is equivalent to linear approximation of the results of detection of densities corresponding to a plurality of laser light amounts. Therefore, the density gradient G can be obtained by dividing a difference between the densities of the toner patterns P3 and P5 by a difference (%) between the light amounts for the toner patterns P3 and P5. α denotes error in the toner pattern P6 with respect to the toner pattern P3, and can be obtained by dividing the difference between the densities of the toner patterns P3 and P6 by the density gradient G. R, a correction coefficient, is a value determined from a relationship between shading data (duty cycle) and a light amount, the laser characteristics, and the densities of the toner patterns P3 and P6. Y denotes a difference between a duty cycle of 100% and the shading data of the toner pattern P6 (a duty cycle of 80%). X denotes a difference between a duty cycle of 100% and the light amount for the toner pattern P3. Expression 3 is effective because the correction coefficient R is a coefficient for correcting the modification data so as to eliminate the error α. For example, when error α=10%, correction coefficient R=2.

As has been described above, the first toner patterns are formed with a light amount (e.g. 80% of the APC light amount) that is obtained by reducing the target light amount (e.g. 100% of the APC light amount) by a predetermined percentage (e.g. 20%). On the other hand, the second toner pattern group is formed with a light amount that is obtained by the shading control unit 609 executing the reduction by a predetermined percentage (e.g. 20%). The CPU 204 determines the correction coefficient R that is used by the shading control unit 609 for the degree of control for each scanning position in common, so that there is no difference (error α) between the detected values of the first toner pattern group and the detected value of the second toner pattern group.

The CPU 204 can obtain the corrected modification data Duty cycle_i by multiplying the modification data Ci for each scanning position by the multiplier coefficient, namely the correction coefficient R. Specifically, the CPU 204 sets the correction coefficient R to the PWM signal generation unit 611, and the PWM signal generation unit 611 generates a corresponding PWM signal by multiplying the modification data Ci for each scanning position by the correction coefficient R.

Hence, the correction coefficient R has a constant value regardless of a scanning position on the image region. This is shown in the following Expression 4.

$$\text{Duty cycle}\_i = (1-Ci) \times R \qquad \text{Expression 4}$$

Duty cycle_i denotes modification data that has been corrected using the correction coefficient R in a region i. Ci denotes modification data prior to the correction in the region i.

By thus using the correction coefficient R, when the shading data is set to 80% (the modification data is set to 20%), laser light having a light amount corresponding to 80% of the APC light amount is output. Although the above has described the operational flow for one of the colors Y, M, C and K, the adjustment is made with respect to the other three colors in sequence.

In the present embodiment, five toner patterns are formed using a light amount that is adjusted in five levels on the basis of the APC light amount. However, the number of levels and the levels of the light amount are not limited in this way. The present embodiment has described a method for detecting the densities of the toner patterns using the density sensor 201 that is arranged facing the circumferential surface of the sheet conveyance belt 106.

Alternatively, the present embodiment may employ a method for detecting the electric potentials of latent image patterns using the electric potential sensor 202 that is arranged facing the circumferential surface of the photosensitive drum 102 as shown in FIG. 4. This is because the electric potentials of the latent image patterns substantially corresponding to the toner densities. When the adjustment is made based on the output from the electric potential sensor 202, the calculations of Expressions 1 to 4 may be performed as-is while substituting the densities with the electric potentials. In this manner, the electric potential sensor 202 detects the electric potentials of latent images, namely a first latent image pattern group and a second latent image pattern group.

In the present invention, the toner patterns are formed on an image carrier such as a sheet conveyance belt, an intermediate transfer member and a photosensitive member, and a correction coefficient for shading data (modification data) can be calculated from a relationship between the densities or electric potentials of the toner patterns and the degrees of shading control. In this way, the image forming apparatus can execute shading control without needing a plurality of D/A converters and is thus advantageous in terms of cost. Furthermore, in the present invention, the laser drivers 203 need not have a function of detecting a light emitting threshold for the lasers 205 and a function for detecting the light amount gradient characteristics. This enables shading control with less expensive configurations and higher accuracy. Moreover, components for density control that are conventionally included in the image forming apparatus 1 may be used for the CPU 204, the density sensor 201 and the electric potential sensor 202. As additional components are not required, this configuration is advantageous in terms of cost. In the above-described manner, even when the light amount output characteristics with respect to the driving current of a laser have changed due to changes in the ambient temperature and deterioration in durability of the laser, the light amount output characteristics can be modified using the correction coefficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-237960, filed Oct. 28, 2011 and 2012-222543, filed Oct. 4, 2012, which are hereby incorporated by reference herein in their entirety.

What is claimed is:

1. An image forming apparatus, comprising:
   a light source constructed to output a light beam;
   a light amount control unit constructed to execute light amount control to make a light amount of the light beam output from the light source equal to a target light amount;
   a deflection unit constructed to deflect the light beam output from the light source and scan a surface of a scan target using the deflected light beam;
   a shading control unit constructed to control the light amount of the light beam output from the light source by controlling a driving current for the light source for each scanning position on the surface of the scan target;
   a correction unit constructed to correct the driving current using a correction amount corresponding to (i) a detected value of a first patch formed with a light amount obtained by the light amount control unit reducing the target light amount by a predetermined percentage, and (ii) a detected value of a second patch formed with a light amount obtained by the shading control unit reducing the target light amount by the predetermined percentage; and
   a correction coefficient determination unit that determines a correction coefficient that is used by the shading control unit for a degree of control for each scanning position in common, so that there is no difference between the detected value of the first patch formed with the light amount obtained by the light amount control unit reducing the target light amount by the predetermined percentage and the detected value of the second patch formed with the light amount obtained by the shading control unit reducing the target light amount by the predetermined percentage,
   wherein the correction unit corrects the driving current using the correction amount by multiplying the degree of control for each scanning position by the correction coefficient, and
   the shading control unit controls the driving current for the light source using the degree of control for each scanning position that has been corrected using the correction amount.

2. The image forming apparatus claimed in claim 1, wherein
   the first patch is included in a patch group composed of a plurality of patches that have been formed with different light amounts, and
   the correction coefficient determination unit includes:
   a creation unit that creates light amount-detected value characteristics from a correspondence relationship between a plurality of light amounts used to form the patch group and a plurality of detected values obtained from the patch group; and
   a computation unit that obtains a light amount corresponding to the detected value of the second patch from the light amount-detected value characteristics created by the creation unit, and computes the correction coefficient so that there is no error in the light amount corresponding to the detected value of the second patch with respect to the light amount used to form the first patch.

3. The image forming apparatus claimed in claim 1, wherein
the light amount control unit includes:
a light receiving element that receives light output from the light source;
a conversion circuit that converts a current output from the light receiving element into a voltage;
a comparison circuit that compares a voltage output from the conversion circuit with a reference voltage corresponding to a target light amount;
a sample and hold circuit that samples and holds a result of comparison output from the comparison circuit;
a subtraction circuit that outputs a voltage corresponding to a difference between a voltage output from the sample and hold circuit and a voltage output from the shading control unit; and
a current source that supplies a driving current corresponding to the voltage output from the subtraction circuit to the light source, and
the shading control unit includes:
a pulse signal generation unit that generates a pulse signal with a duty that has been corrected using the correction coefficient; and
a low-pass filter that applies a voltage generated by low-pass-filtering the pulse signal to the subtraction circuit.

4. The image forming apparatus claimed in claim 1, further comprising
a density detection unit that detects densities of toner patterns which are the first patch and the second patch,
wherein the correction unit corrects the driving current using a correction amount corresponding to the detected density values of the first and second patches detected by the density detection unit.

5. The image forming apparatus claimed in claim 1, further comprising
an electric potential detection unit that detects electric potentials of latent images which are the first patch and the second patch,
wherein the correction unit corrects the driving current using a correction amount corresponding to the detected electric potential values of the first and second patches detected by the electric potential detection unit.

* * * * *